(12) United States Patent
Patel et al.

(10) Patent No.: US 8,112,585 B2
(45) Date of Patent: Feb. 7, 2012

(54) METHOD AND APPARATUS FOR DYNAMICALLY SWITCHING CACHE POLICIES

(75) Inventors: Naresh Patel, Sunnyvale, CA (US); Jeffrey S. Kimmel, Chapel Hill, NC (US); Garth Goodson, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 394 days.

(21) Appl. No.: 12/433,758

(22) Filed: Apr. 30, 2009

(65) Prior Publication Data
US 2010/0281216 A1 Nov. 4, 2010

(51) Int. Cl.
*G06F 12/06* (2006.01)
(52) U.S. Cl. .............................. 711/118; 711/3; 711/119
(58) Field of Classification Search .................. 711/118, 711/119, 3
See application file for complete search history.

(56) References Cited

U.S. PATENT DOCUMENTS

| | | | |
|---|---|---|---|
| 6,226,707 B1 * | 5/2001 | Mattela et al. .................... 711/3 |
| 6,338,115 B1 * | 1/2002 | Galbraith et al. .............. 711/113 |
| 6,789,156 B1 * | 9/2004 | Waldspurger ..................... 711/6 |
| 7,353,319 B2 * | 4/2008 | Speier et al. ...................... 711/5 |

* cited by examiner

*Primary Examiner* — Son Dinh
(74) *Attorney, Agent, or Firm* — Perkins Coie LLP (57) ABSTRACT

A method implements a cache-policy switching module in a storage system. The storage system includes a cache memory to cache storage data. The cache memory uses a first cache configuration. The cache-policy switching module emulates the caching of the storage data with a plurality of cache configurations. Upon a determination that one of the plurality of cache configurations performs better than the first cache configuration, the cache-policy switching module automatically applies the better performing cache configuration to the cache memory for caching the storage data.

24 Claims, 5 Drawing Sheets

METHOD AND APPARATUS FOR DYNAMICALLY SWITCHING CACHE POLICIES

FIELD OF THE INVENTION

At least one embodiment of the present invention pertains to storage systems, and more particularly, to the implementation of a dynamic cache-policy switching network storage system.

BACKGROUND

A storage server is a computer system and a form of storage controller that is used to store and retrieve data on behalf of one or more clients on a network. A storage server operates on behalf of one or more clients to store and manage data in a set of mass storage devices, such as magnetic or optical storage-based disks or tapes. A storage server may be configured to service file-level requests from clients, as in the case of file servers used in a Network Attached Storage (NAS) environment. Alternatively, a storage server may be configured to service block-level requests from clients, as done by storage servers used in a Storage Area Network (SAN) environment. Further, some storage servers are capable of servicing both file-level and block-level requests, such as certain storage servers made by NetApp®, Inc. of Sunnyvale, Calif.

A storage server often allocates cache memory or interacts with a separate cache server to speed up the retrieval of data stored in the server's mass storage devices. Retrieving data from the cache memory of the storage server is faster and more efficient than retrieving the same data repeatedly from the mass storage devices, which have higher latency than the cache memory. However, the cache memory is usually volatile, and has less storage capacity than the mass storage devices. Once the cache memory becomes full, some of the old cached data need to be removed in order to create space for the newly requested data. Thus, the performance of a cache memory depends on how to keep the frequently requested data in the cache memory for as long as possible. For example, certain cache replacement policies rotate out the least accessed data in the memory to make space for the newly requested data. Other cache replacement approaches may discard data based on the last time the data is requested. Thus, the performance of a cache memory largely depends on which of these cache replacement policies is implemented.

The performance of a cache memory also depends on the cache memory capacity and how data stored in the storage server is used by different applications. For example, an airline flight reservation system may generate a large amount of short and concurrent data storage transactions, while a reservation reporting system may summarize a large quantity of storage data in a long and single storage transaction. A cache policy based on the frequency of the data being accessed may be suitable for one type of application, but may hinder the performance of another type. Since no single cache configuration can satisfy all types of storage usage, the capacity or the cache policy of a cache memory need to be frequently evaluated to make sure it is appropriate for the type of usage the storage server is currently experiencing.

However, it is often impractical to predict what kind of data access pattern the storage server will encounter. Also, it is hard to evaluate the performance of a cache memory under its existing cache policy when there is no alternative with which to compare it. Even if an ideal cache policy is implemented, there is no indicator to show that this particular cache policy performs better than any other alternatives. When a performance enhancement cannot be demonstrated, a storage server administrator may be less inclined to invest in additional cache memory or to change the cache memory to a different caching configuration. Thus, selecting a cache configuration for a cache memory becomes a "hit or miss" estimation. Further, it is impractical to simultaneously implement multiple cache memories in the same storage server in order to experiment these different alternatives. Such an approach is wasteful of precious memory resources.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for implementing a dynamic cache-policy switching storage system are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

To ensure that a cache memory in a storage system is properly configured, a dynamic cache-policy switching module can be deployed in the storage system to emulate a set of cache configurations. A cache configuration is a configuration of cache memory size and/or cache replacement policy that can be implemented on a real cache memory for caching storage data. The cache configuration also includes application logics, data structures, and data storage to support the various caching functions. An emulated cache configuration, also referred to as a cache emulation, can emulate a cache configuration with a different cache size and/or a different cache replacement policy. Multiple emulated cache configurations, which run concurrently along with the real cache memory, can perform simulated caching of the same real-time storage data that is being cached by the real cache memory. Periodically, cache performance information is collected from the emulated cache configurations and from the real cache memory for comparison purpose. Based on the performance information, a better performing cache configuration is identified. If the better performing cache configuration is different from the one applied to the real cache memory, and can be dynamically applied to the real cache memory, the dynamic cache-policy switching module can automatically switch the configuration of the real cache memory to the better performing one, thereby ensuring that the storage system is frequently optimized for caching the storage data.

In one embodiment, with respect to the cache memory of the storage system, an emulated cache configuration can emulate a cache memory with a same or different size, a same or different cache policy, or the combination thereof. A cache policy defines rules that are used to determine whether a read request can be satisfied by a cached copy of the requested data or when other data already cached should be replaced with the requested data. Cache policy can also dictate whether data from a write request should or should not be first stored in the cache memory before being committed to the mass storage devices. To cache a piece of data in the cache memory, a hash configuration, including a hash function and a hash structure, can be implemented to locate the memory block used for caching the piece of data. The hash function can convert a data identifier into one of the fixed number of the hash values. The hash structure includes multiple hash sets, each of which corresponds to one of the hash values. Each hash set also contains multiple hash records for storing metadata related to the cached data.

For all caching operations with respect to a piece of data, the storage system can input the data's key to the hash function for a hash value and use the hash value to identify a hash set in the hash structure. When the piece of data is to be cached, the storage system can create a hash record, save the metadata of the data to the hash record, store the hash record in the previously identified hash set, and store the data to memory blocks of the cache memory. For cached data lookup, the storage system can scan the hash set to locate the hash record associated with the cached data, and read the hash record to find the memory blocks that contains the cached data. To replace a cached data, the same hash record can be similarly located before the metadata is cleared from the hash structure and the memory blocks that contain the cached data are cleared.

Since for every piece of data cached in the memory blocks, a hash record would also be stored in a hash set of the hash configuration, an emulated cache configuration can utilize a similar hash configuration without the memory blocks, and simulate the cache operations, such as data insertion, data lookup, and data replacement, etc, solely on the hash configuration. In other words, the emulated cache configuration performs metadata caching without actually storing the actual data to the memory blocks. Thus, the memory required for emulating a cache memory configuration can be greatly reduced comparing to a real cache memory configuration. Further, the emulated cache configuration collects relevant performance information during emulation. The collected performance information can then be used by a cache-policy switching module to determine whether the emulated cache configuration is performing better or worse than the cache memory's existing configuration.

In one embodiment, an emulated cache configuration can further reduce its memory and processing throughout requirements by simulating the caching of only a fraction of the real-time storage data. The fraction of the storage data can be sampled by selecting the real-time storage data that is associated with a specific set of hash values. The specific set of hash values can be selected either by choosing one out of every N number of hash values, or by randomly choosing 1/N of the total hash values. For the storage data that is associated with one of the specific hash values, the emulated caching operations are performed normally. For the storage data that does not correspond to those hash values, no emulation is performed, and the storage data are ignored. Thus, by sampling a fraction of the storage data, memory required for maintaining the simulated data in the hash configuration, and CPU resource needed for emulating the caching operations can be further reduced. To make sure that the emulation accurately reflects the performance of a cache configuration based on the full set of storage data, the sampled cache emulation can be performed for a longer period of time to compensate for the smaller amount of data maintained in the hash configuration.

In one embodiment, upon a determination that the existing configuration of the cache memory performs better than the emulated cache configurations, no additional action is required until a future performance evaluation determines otherwise. When any one of the emulated cache configurations is deemed superior to the existing cache configuration based on the collected performance indicators, the cache-policy switching module can dynamically implement the better performing cache configuration to the cache memory without user intervention. Alternatively, the cache-policy switching system can inform an administrator of the storage system on how to implement the better-performing configuration in fine-tuning the cache memory (e.g., adding more cache memory, etc). Further, the storage system can continuously emulate the different cache configurations for further comparison, once the cache memory is warmed up (processed for a predetermined period of time) under the newly applied, better-performing cache configuration.

Figure 1:
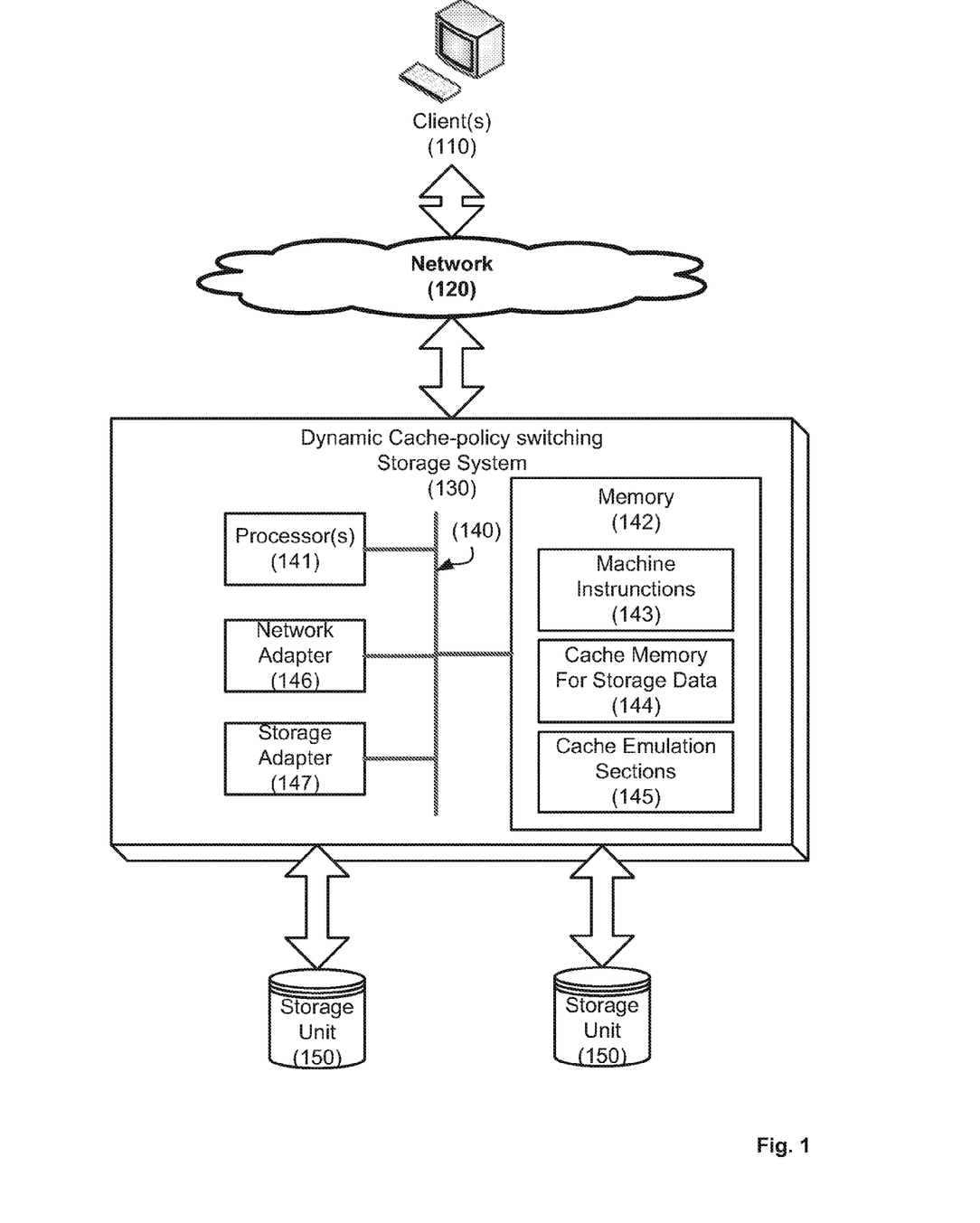
FIG. 1 illustrates a network storage environment in which the present invention can be implemented.

Refer now to FIG. 1, which shows a network storage environment in which the present invention can be implemented. In FIG. 1, a dynamic cache-policy switching storage system 130 provides data storage services to one or more clients 110 via a network 120. A client 110 may be, for example, a conventional personal computer (PC), server-class computer, workstation, handheld computing or communication device, or the like. The network 120 may be, for example, a local area network (LAN), wide area network (WAN), metropolitan area network (MAN), global area network such as the Internet, a Fibre Channel fabric, or any combination of such interconnects. The storage system 130 can be, for example, a file-level storage server such as used in a NAS environment, a block-level storage server such as used in a SAN environment, or a storage server which is capable of providing both file-level and block-level service to clients 110. The storage system 130 receives and responds to various read and write requests from the clients 110, directed to data stored in or to be stored in the storage units 150. The storage units 150 can include, for example, conventional magnetic or optical disks or tape drives; alternatively, they can include non-volatile solid-state memory, such as flash memory, solid-state drives (SSDs) etc. The storage units 150 can also be located internally or externally to the storage system 130.

In one embodiment, the storage system 130 includes one or more processors 141, memory 142, and other devices such as communication devices (e.g., network adapter 146, storage adapter 147, etc.), interconnects (e.g., bus 140, peripherals), etc. The processor(s) 141 may include central processing units (CPUs) of the storage system 130 and, thus, control the overall operation of the storage system 130. In certain embodiments, the processor(s) 141 accomplish this by executing software or firmware stored in memory 142. The processor(s) 141 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The memory 142 is or includes the main memory of the storage system 130. The memory 142 represents any form of random access memory (RAM), read-only memory (ROM), flash memory (as discussed below), or the like, or a combination of such devices. In use, the memory 142 may contain, among other things, a set of machine instructions 143 which, when executed by processor 141, causes the processor 141 to perform operations to implement embodiments of the present invention.

In one embodiment, the network adapter 146 contains one or more ports to allow the storage system 130 to communicate with external systems, such as clients 110, over a network. Through the network adapter 146, the storage system can exchange frames or packets of data with the external systems according to standard or proprietary network communication protocols such as TCP/IP, etc. The storage adapter 147 can be used to access data stored in the storage units 150. Furthermore, other types of storage devices such as backup devices, CD or DVD drives, etc, can also be accessed via the storage adapter 147. It can be apparent to those skilled in the art that the network adapter 146 and the storage adapter 147 can be combined into one hardware component. Further, the processor 141, memory 142, network adapter 146 and storage adapter 147 can be interconnected by a system bus 140, which helps transmitting data among these various system components.

In one embodiment, the memory 142 includes a cache memory 144 for caching storage data. The cache memory 144 can be implemented either by dedicating a section of the memory 142 for cached data, or by having a separate cache memory device connected with the memory 142 and the processor 141. Further, multiple levels of cache memories can be maintained in the storage system 130. For example, a first-level cache can be utilized by the processor 141 to speed up the access of storage data, and a second-level cache can be implemented to support the operation of first-level cache. The cache memory 144 can include blocks of contiguous memory for temporarily storing the data that may be accessed multiple times. It can also have memory blocks that are randomly distributed across the memory 142. The cache memory 144 can greatly improve the performance of a storage system 130 by saving duplicated copies of data stored or to be stored in storage units 150. Once the data is saved in the cache memory 144, further requests for the data can be satisfied by directly retrieving the duplicated copy from the cache memory 144, rather than fetching the data from the storage units 150. Alternatively, the cache memory for storage data 144 and the cache emulations 145 can also be implemented in a cache system outside of and separate from the storage system 130. The details about data caching are further described below.

In one embodiment, the memory 142 also reserves sections 145 for emulating different cache configurations. A cache configuration is a configuration of cache memory size and/or cache replacement policy that can be implemented on the real cache memory 144 for caching storage data. The cache configuration also includes application logics, data structures, and data storage to support the various caching functions. The emulated cache configurations utilize the real-time storage data cached or to be cached in the cache memory 144, and emulate a cache memory that is configured with different cache sizes or cache policies. Further, in order to minimize the impact to the main memory 142 and the cache memory 143, some of the emulated cache configurations sample a fraction of the real-time storage data and process only the sampled storage data. The sampled cache emulations reduce memory usage in section 145 without compromising the accuracy of performance evaluation. The cache emulation sections 145 can contain hash structures for emulating caching operations, and other data structures for storing caching performance indicators. Details about these structures are described below.

In one embodiment, a cache-policy switching module (not shown in FIG. 1) executing in the storage system 130 can periodically evaluate the emulated cache configurations to identify the better performing ones. Afterward, the cache-policy switching module can dynamically switch the caching configuration utilized by the cache memory 144 to the better performing one. Such an approach is advantageous since the administrator of the storage system 130 no longer needs to predetermine a cache policy in advance. Nor does he need to constantly monitor the performance of the current cache configuration or second-guess whether such configuration is an optimal choice. By dynamically switching to an optimal cache configuration, the storage system 130 can implement a corresponding cache policy when the data usage patterns are constantly changing. Thus, the administrator can be confident that the storage system 130 is configured to serve the data in a cost-efficient and high-performing way.

Figure 2:
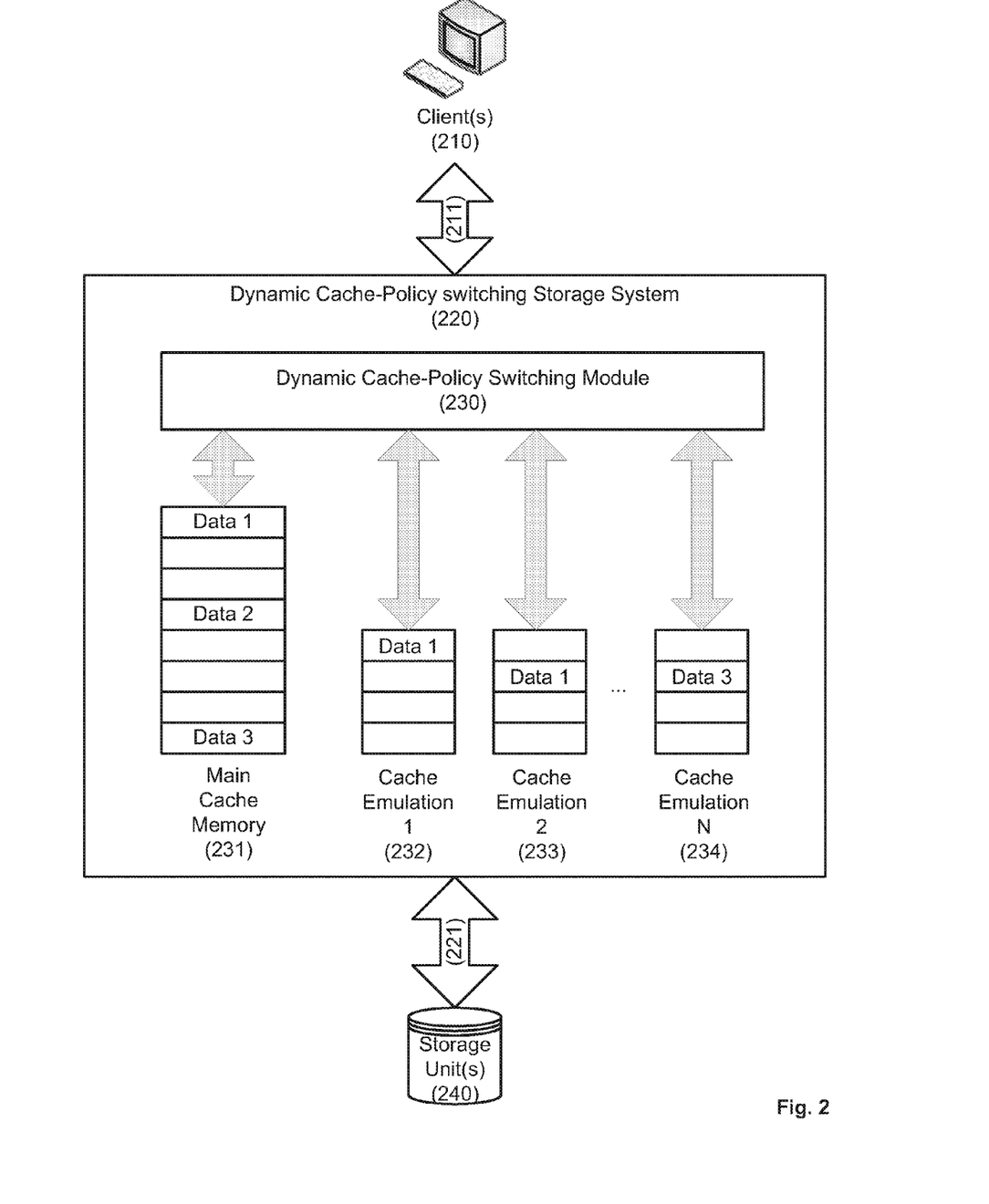
FIG. 2 illustrates an implementation of a dynamic cache-policy switching storage system.

FIG. 2 illustrates an implementation of a dynamic cache-policy switching storage system 220, in accordance with certain embodiments of the present invention. In FIG. 2, the dynamic cache-policy switching storage system 220, which can be the storage system 130 of FIG. 1, provides data storage services to clients 210 for data stored in a set of storage units 240. The clients 210 are similar to the clients 110 of FIG. 1, and the set of storage units 240 are similar to storage units 150 of FIG. 1. Further, the storage system 220 also maintains a main cache memory 231 and a set of cache emulations 232-234. Besides being utilized by the storage system 220 for providing data services, the cache memory 231 is also monitored by a dynamic cache-policy switching module 230. The switching module 230 can examine the performance of the cache memory 231 for comparing with the performance of the cache emulations 232-234, and switch the cache policy of the cache memory 231 to a better performing one.

In one embodiment, the main cache 231 provides read caching services for the clients 210. Upon receiving a read request 211 from a client 210 for a piece of data, "data 1", stored in the storage unit 240, the storage system 220 checks to see whether the data is available in the cache memory 231. If such data is not found in the cache memory 231, a situation commonly referred to as "cache miss", the read caching service loads the piece of data from the storage unit 240 and stores it in the cache memory 231. The data can be transmitted to the client 210 while it is being saved in the cache memory 231. When the same data is requested again by the same or a different client 210, as long as the data is not updated in the storage unit 240, the cached copy of the data can be quickly located (cache hit) and served to the client 210 from the cache memory. Since in a cache hit situation, the data is not required to be retrieved from the storage unit 240 again, the cache memory 231 significantly increases the performance and availability of the storage system 220 in providing data services.

In one embodiment, the storage system 220 provides write caching services for the clients 210. In a write-through caching scheme, upon receiving a write request 211 from a client 210 to store a piece of data in the storage unit 240, the storage system 220 first stores the data in the cache memory 231, and synchronously saves the data to the storage unit 240. Synchronous operation ensures that the data is cached in the cache memory 231 and committed to the storage unit 240 in a single transaction. Thus, the piece of write data is either stored or not stored at all in both the cache memory 231 and the storage unit 240. When subsequent read requests are received by the storage system 220 for the data in the previous write request, the data can be retrieved directly from the cache memory 231 without accessing the storage unit 240.

In one embodiment, the storage system 220 implements a write-back caching scheme. In a write-back caching scheme, the data to be stored in the storage unit 240 is first cached in the cache memory 231 before being persistently stored (committed) to the storage unit 240. Periodically, the uncommitted data, which is data that is cached but not yet stored to the storage unit 240, is asynchronously transmitted in batches to the storage unit 240 for persistent storage. Since in an asynchronous operation, the data is deemed stored even though it is not yet committed to the storage unit 240, to guarantee that the uncommitted data is not at risk of being lost, the storage system 220 can employ multiple data redundancy policies to make sure that even during disastrous situations, the uncommitted write data previously stored in the cache memory 231 can be recovered and re-applied to the storage unit 240. Examples of such policies include: utilizing independently and redundantly powered memory to store the uncommitted data; replicating uncommitted data to multiple locations, and/or employing redundant configurations for the storage system 220, etc.

In one embodiment, the data stored in the cache memory 231 can be swapped out of the cache system 220 if it is not frequently requested by the client 210. Swapping out a seldom accessed data, or replacing the cached data, removes such data from the cache system to create space for the caching of newly requested data. For example, a piece of cached data can have an associated timestamp and counter indicating the last time the data has been requested and the frequency of the previous requests. If there is no space left in the cache memory 231, and newly requested data is not in the cache memory, then less requested data can be removed from, or swapped out of, the cache memory 231 to create space for the newly requested data. In addition, cache coherence can be frequently checked to guarantee the consistency of the data stored in the cache memory 231. When the data in the storage unit 240 is updated or deleted without the knowledge of the storage system 220 (e.g., via a different storage system having access to the storage unit 240), the cached data becomes stale and needs to be synchronized with the stored data before such data is served to the clients 210.

In one embodiment, a cache policy, or a cache algorithm, is a set of rules that can be utilized for managing the cached data in a cache memory and controlling how the cached data should be replaced (swapped out). Examples of caching policies include, but are not limited to, Least Recently Used (LRU), Most Recently Used (MRU), Least Frequently Used (LFU), Pseudo-LRU, Segmented LRU, 2-way associative, etc. For example, the LRU cache policy first discards the least recently used data in the cache memory. By tracking the cached data in the cache memory with respect to their usage, the policy can determine which piece of data has not been used recently, and should be replaced with newer data. In comparison, the MRU policy discards the most recently used items first, under the assumption that the older a piece of data is in the cache memory, the more likely it would be requested again.

In one embodiment, the performance of the cache policies can be evaluated based on a set of performance indicators such as "hit rate", "miss rate" and "latency", etc. As the performance enhancement of a cache memory comes from locating the data in the cache memory, the hit rate describes how often a requested piece of data is found in the cache; and the miss rate tallies how often a requested data is not in the cache. The better performance a cache policy has with respect to one type of data usage, the higher its hit rate and the lower its miss rate would be. The latency refers to how long it takes to retrieve requested data from the cache memory, once it is determined that the data is in the cache memory. Thus, the shorter time it requires to retrieve the cached data from the cache memory, the better performance the cache policy has. The performance of a cache memory can also be improved by increasing the size of the cache. However, the cost of adding more cache memory can be a trade-off to the performance enhancement. Since different applications may have different data usage patterns, no single cache policy would be satisfactory for all types of storage data usage. Thus, these performance indicators allow different cache policies to be measured and compared to evaluate whether the policies are effective in performance improvement.

In one embodiment, the storage system 220 implements a set of cache emulations 232-234 with different cache configurations. A cache emulation emulates a cache memory processing the same storage data as the main real cache memory 231 does. The cache emulation contains data structures to store and manage the simulated data and performs similar caching functions as described above (e.g., cache read, cache write, or swap-out, etc) in response to data requests. For example, a cache emulation can emulate a cache memory configuration having the same size but a different cache policy as the main cache memory 231. The cache emulation can also emulate a different sized cache memory 231 but with the same cache policy. In FIG. 2, some of the cache emulations 232-234 can emulate different cache policies, while the rest of the cache emulations 232-234 can emulate different cache sizes, or the combination thereof. Further, the memory usages for the cache emulations 232-234 are monitored and restricted so that they do not take the memory space away from the storage system 220 in performing its storage services.

In one embodiment, a dynamic cache-policy switching module 230 manages and controls the cache emulations 232-234 for performing dynamic cache-policy switching. The module 230 can configure the cache emulations so that each of them distinctively emulates a specific cache configuration. The module 230 also collects performance information from the main cache memory 231 and the cache emulations 232-234 for comparison. During emulation, the module can transmit real-time storage data that are being cached in the main cache memory 231 to each of the cache emulations 232-234. Based on the real-time storage data, the module 230 can emulate the performing of a cache read or a cache write on the cache emulations 232-234, as the same operation is being performed on the cache memory 231. Further, upon a determination that a better cache configuration exists in the cache emulations 232-234, the module 230 can automatically switch the main cache memory 231 to the better configuration or a configuration similar to the better one.

In one embodiment, a cache read or a cache write is emulated by each of the cache emulations 232-234 based on real-time data requests from clients 110. A real-time read or write request can be received from a client 210 and served by the storage system 220 with the help of the cache memory 231. In the meantime, the same data request is also transmitted by the module 230 to the cache emulations 232-234. For example, if the data request is to read data store in the storage unit 240, each of the cache emulations 232-234 can perform a cache lookup to locate the requested data in its internal structure. If the requested data is not found, the cache emulations 232-234 can simulate the retrieval of the data from the storage unit 240 and simulate the caching of the data in their respective internal structures, without actually accessing the storage unit or caching the requested data into memory blocks. If a data request is to write data to the storage unit 240, the cache emulations 232-234 can simulate the caching of the data to their internal structure and the saving of the data to the storage unit 240, without storing the data to the memory blocks or the storage unit 240. Likewise, a cache emulation can replace/swap-out some of the cached data based on its own cache policy, if its simulated cache storage is full. Note that the cache emulations 232-234 focus mainly on caching operations, as they do not perform actual data saving or retrieving, nor respond to client requests 211. Thus, the cache memory 231 and the cache emulations 232-234 can operate concurrently and independently based on their own cache policies.

In one embodiment, some of the cache emulation 232-234 can operate on a fraction of the requested data that are transmitted to them by the module 230. If a cache emulation determines that a particular piece of data is to be cache-emulated, the emulation would simulate the caching of the piece of data. Otherwise, no further emulation action is necessary. For example, in response to a real-time read request, "data 1", "data 2" and "data 3" are retrieved from the storage unit 240 and cached in the main cache memory 231. The data request is also submitted by the module 230 to each of the cache emulations 232-234. However, the cache emulation 232-234 can determine whether to simulate the caching of these three pieces of data, depending on their respective configurations. In FIG. 2's example, emulating the caching of "data 1" is opted and performed by emulations 232 and 233, but not emulation 234. Likewise, the caching of "data 3" is selectively emulated by emulation 234, but not others; and none of the emulations 232-234 selects "data 2" for cache emulation. By selectively emulating the caching of a fraction of the data, or sampling, the emulations preserve a substantial amount of memory for the storage system 220. The details about how caching can be emulated and how data can be selectively cached are further described below.

In one embodiment, at a predetermined interval, the module 230 collects performance information from the main cache memory 231 and the cache emulations 232-234 for evaluation. Since the cache emulations 232-234 utilize real-time data for emulation, their performances substantially reflect the performances of these emulated configurations as applied to the cache memory 231. For example, the cache emulations 232-234 as well as the cache memory 231 collect their own performance data during cache read, cache write or cache swap-out operations, and record the hits, misses, and latency from these operations. Later, the collected data can be used for performance comparison.

In one embodiment, upon a determination that an emulated cache configuration would have performed better, the dynamic cache-policy switching module 230 can replace the cache memory's existing cache configuration with the better performing one. Once a new cache configuration is implemented on the main cache memory 231, the remaining cache emulations 232-234 can continue their existing simulations or change to different configurations. The new emulations can later be evaluated against the cache configuration of the main cache memory 231. Thus, even when the data usage patterns are constantly changing for the storage system 220, the module 230 can adapt the suitable cache configurations to such changes. Such an approach is advantageous since it greatly simplifies the selection of a cache policy and reduces the second-guessing of such selection.

Figure 3:
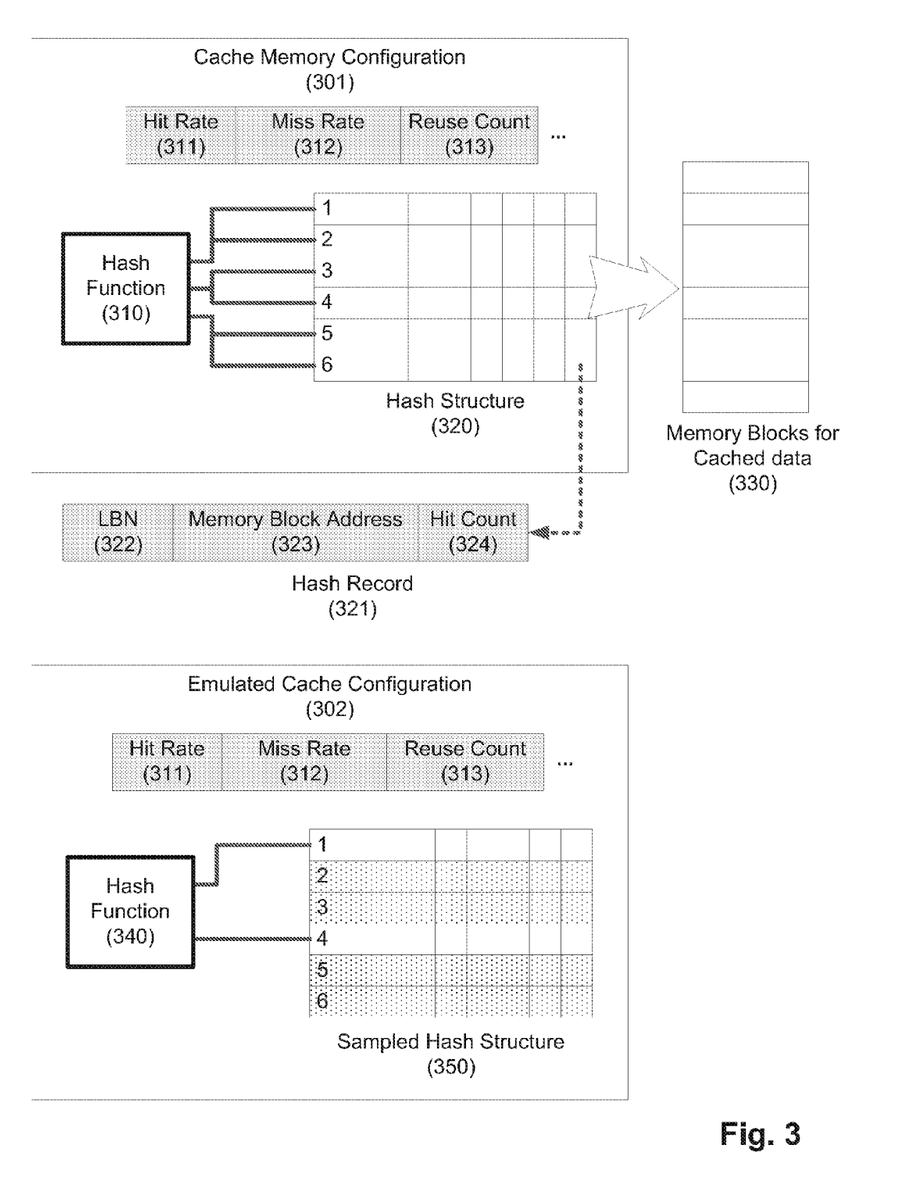
FIG. 3 illustrates a cache memory configuration and a cache emulation configuration.

FIG. 3 illustrates a cache memory configuration and a cache emulation configuration, in accordance with certain embodiments of the present invention. In FIG. 3, a cache memory configuration 301 includes a hash function 310, a hash structure 320, as well as multiple memory blocks 330. The memory blocks 330 can be allocated from the cache memory 144 of FIG. 1. An emulated cache configuration 302 includes a hash function 340 and a hash structure 350. The hash functions 310 and 240 can be implemented as a set of machine instructions executed by a processor 141 of FIG. 1 and/or stored in the memory 142 of FIG. 1. Similarly, the hash structure 320 and 350 can be stored in the memory 142 of FIG. 1, and be utilized by a cache-policy switching module 230 of FIG. 2.

Referring back to FIG. 3, the hash functions 310 and 340 allow quick identifying and retrieval of cached data stored in the memory blocks 330. A hash function can be a mathematical function to convert a search key into a fixed and unique hash value. The mathematical function determines how many fixed hash values can be generated and how a search key is converted to one of the hash values. The hash value can then be used for data lookup or comparison. An ideal hash function maps the expected inputs as evenly as possible over its output range. Thus, for all possible input keys, every hash value should be generated with a similar probability. In one embodiment, the search key can be a logical block number (LBN) or a physical block number (PBN) used to identify a block of data stored in the physical storage or cached in a cache memory. The hash value generated from the block number can be used in the process of locating the memory block that caches the stored data.

In one embodiment, the hash functions 310 and 340 are associated with their respective hash structures 320 and 350. A hash structure contains multiple hash sets, each of which corresponds to one of the fixed and unique hash values. Thus, a hash set is a set of hash records 321 for the storing of information that is associated with one hash value. A hash record 321 stores metadata, which is data about data, about the data being cached. Each hash record 321 contains a key inputted into the hash function and a value that is associated with the key, as well as other information. Since a hash function can map different keys into the same fixed hash value, data with the same hash value can then be converted into the hash records to be stored in the same hash set. During an operation to store a piece of data to a hash structure, the first step is to convert the key for the data to a hash value and locate the hash set that is associated with the hash value. Afterward, the data to be stored can be converted into a hash record, which in turn is added to the identified hash set. Similarly, to retrieve a cached data from the hash structure, the key for the data can be converted to a hash value to identify the hash set, and the cached data can then be retrieved based on the hash record found in the hash set. In FIG. 3, there are six hash sets in the hash structure 320. Each of the six hash sets, represented by a table row with its hash value displayed in the first column of the row, corresponds to one of the six fixed hash values (e.g., 1-6).

In one embodiment, the hash records within each hash set of the hash structures 320 and 350 correspond to cached data stored in the memory blocks 330. Each hash record 321 contains an input key (LBN 322) and a memory address 323. Note that a LBN 322 can be used as a key to identify a piece of data stored in the storage unit, and the memory address 323 refers to a location in the memory blocks 330 for caching the piece of data. Each hash record 321 also maintains additional metadata information such as how many times the cached data has been accessed in the cache memory (hit count 324), etc. Additional cache performance indicators for a specific cache configuration, such as hit count 311, miss count 312, reuse count 313, and other metadata (not shown in FIG. 3) such as eviction information, least recently used block information, etc, are maintained in the cache memory configuration 301 and emulated in cache emulation 302.

In one embodiment, without scanning the memory blocks 330 to ascertain whether a piece of storage data is cached, the storage system can input the LBN of the data as a search key to the hash function 310 for a hash value, then locate the hash set that is associated with the hash value. The number of entities in the hash set would be much smaller than (in this example, one-sixth the size of) the records in the memory blocks 330. Therefore, the specific entity can be quickly located by scanning only the hash records in the identified hash set. After ascertaining the specific hash record 321 that contains the LBN 322, the cached data can be uncovered based on the memory address 323 stored in the hash record 321. Further, the hash records in one hash set can be further hashed with a second hash function and a second hash structure, further reducing the amount of time required for searching.

In one embodiment, when a piece of data is to be cached to the memory blocks 330, the hash record for such data is also added to a corresponding hash set in the hash structure 320. Likewise, if the same data is swapped out of the memory blocks 330, the hash record for such data is also removed from the hash structure 320. In addition, the performance indicators, such as hit rate 311, miss rate 312, and reuse/reference count 313, etc, are always recorded and preserved regardless whether the storage data is actually saved to the memory blocks 330 or not. Thus, the hash function and the hash structure are sufficient to emulate the cache memory performing under a specific configuration. Therefore, a cache emulation containing the hash function 310 and the hash structure 320, but without the actual memory blocks 330, greatly reduces the amount of memory required for emulating a cache configuration. Further, the cache emulation allows the emulation of a cache policy in a storage system that does not have a real cache memory implemented.

In one embodiment, a cache emulation can emulate a cache memory configuration with a different cache size or a different cache policy. Thus, the cache emulation could construct a hash structure 320 that can hold more or fewer hash records than a structure that is used by the actual cache memory. The performance information collected from the cache emulation can provide a system administrator detailed statistics to determine whether to increase or decrease the actual cache memory size. The information can also be useful in determining whether the cost of adding or removing cache memory justifies the resulting performance increase or decrease. Similarly, the different cache policies are largely implemented via the hash function, the hash structure, and the application logic that manipulates these structures. Therefore, the hash function 340 and the hash structure 350, along with the performance indicators, are sufficient to support the emulating of a cache configuration.

Emulating a cache policy with a full hash structure 320 may still displace a large amount of system memory. Even though a cache emulation without maintaining memory blocks does not take as much space as a fully functional cache memory configuration, the amount of memory could be substantial when multiple cache emulations are simultaneously implemented. Furthermore, emulating with a full hash structure can consume a substantial amount of CPU throughput, as every cache read or cache write operation is repeatedly performed on each of the cache emulations. Thus, a system administrator may be less inclined to tolerate such overloads when there is no immediate performance benefit in running a lot of cache emulations in order to find the best performing one.

Therefore, in one embodiment, a cache policy can be substantially emulated without maintaining all of the hash sets in the hash structure 320. By sampling some, but not all of the hash sets in a cache emulation, the memory utilized by the hash structure can be greatly reduced, and many of the caching operations can be simplified or eliminated. For example, when a piece of data is determined to be excluded from the sampling, further cache read, cache write, or cache swap-out operations can be eliminated, and the CPU throughput can be saved for other usage. Furthermore, a sampled cache emulation can still substantially predict the performance characteristics of a real cache memory. With sampling, maintaining multiple cache emulations becomes possible, as each of the sampled cache emulations incurs a much smaller amount of performance and memory overhead.

In FIG. 3, a hash function 340 is associated with a sampled hash structure 350 for emulating a different cache policy or a different cache size, without any memory blocks being allocated for storing cache data. Sampling means that only a percentage of the hash sets are selected in the hash structure 350 for emulation. Thus, even though the hash function 340 is identical to the hash function 310, a sampled hash structure 350 can contain a fraction of the hash sets as the hash structure 320. In FIG. 3, one in every three hash sets of the hash structure 350 is sampled and selected; and the rest of hash sets, as indicated by rows with dotted patterns, are not maintained and do not take up any memory space. Similar to the hash function 310, the hash function 340 can map an LBN to a hash value. However, since only the sampled hash sets are maintained, if the cache-policy switching module determines that the hash value is associated with a hash set that is not sampled (e.g., hash sets with hash values 2, 3, 5 and 6 in sampled hash structure 350), then no additional function is performed. When the hash value matches one of the sampled values (e.g., value 1 and 4 in sampled hash structure 350), then the cache emulation continues its further data caching operations. Further, only the cache performance statistics for the sampled hash sets are collected and evaluated. Thus, there are no performance statistics collected for the un-sampled hash sets, assuming the un-sampled hash sets have identical statistical properties.

In one embodiment, since only a fraction of the hash structure is maintained, in order to accurately emulate the performance of an actual cache memory, the workload for a sampled cache emulation can be run for a longer period, so that enough statistical performance information can be collected. For example, when 1/N of the original hash sets in a hash structure are emulated, the workload is run for N times longer than a hash structure without sampling. In this way, a sufficient amount of statistics data can be collected and meaningfully compared with a non-sampled cache emulation. Further, by running the sampled emulation longer, the variance of the hit/miss rate across the sampled hash sets can be evened out. Even though the variance of the hit/miss rate from the different sampled hash sets can be an indication of the maximum to minimum hit rate for a specific application, if there is very little variation across the sampled sets, it is likely that the hit rate observed for these sampled sets is very close to the actual hit rate of the workload on a fully implemented cache. Thus, a high variation could indicate that the hash algorithm used in the hash function should be optimized, or that not enough hash sets are sampled.

In one embodiment, every Nth set of the hash structure is selected as a sample set. Alternatively, the sample sets can be randomly selected from the hash structure 350, as long as the total number of the sample sets equals the sampling requirement. Further, the statistic data collected from the sampled cache emulation can indicate whether there are too many or too little sampled hash sets. For example, by analyzing the distribution of hash records in the sampled hash sets, if such a distribution complies with a standard deviation, then the amount of sampling could be deemed sufficient. Otherwise, the system can increase or decrease the sampling percentage accordingly. Similarly, the distributions of the hit/miss rates of the hash records can also collected and analyzed accordingly. Further, the similar sampling scheme can be applied to entities stored within a particular hash set, especially when the entities within the hash set are maintained under a second hash function and a second hash structure.

Thus, the sampled cache emulation not only reduces the amount of memory required for maintaining the hash sets, but also lowers the amount of CPU throughput needed for calculating and searching the hash sets. Furthermore, the sampled cache emulation can provide an accurate view of how a different cache size or a different cache policy could have performed based on the real-time storage data being cached by the actual cache memory. Thus, the sampled cache emulation allows a storage system to emulate as many different cache configurations as feasible, thereby ensuring an optimal cache configuration can be dynamically and automatically selected and applied to the cache memory.

Figure 4:
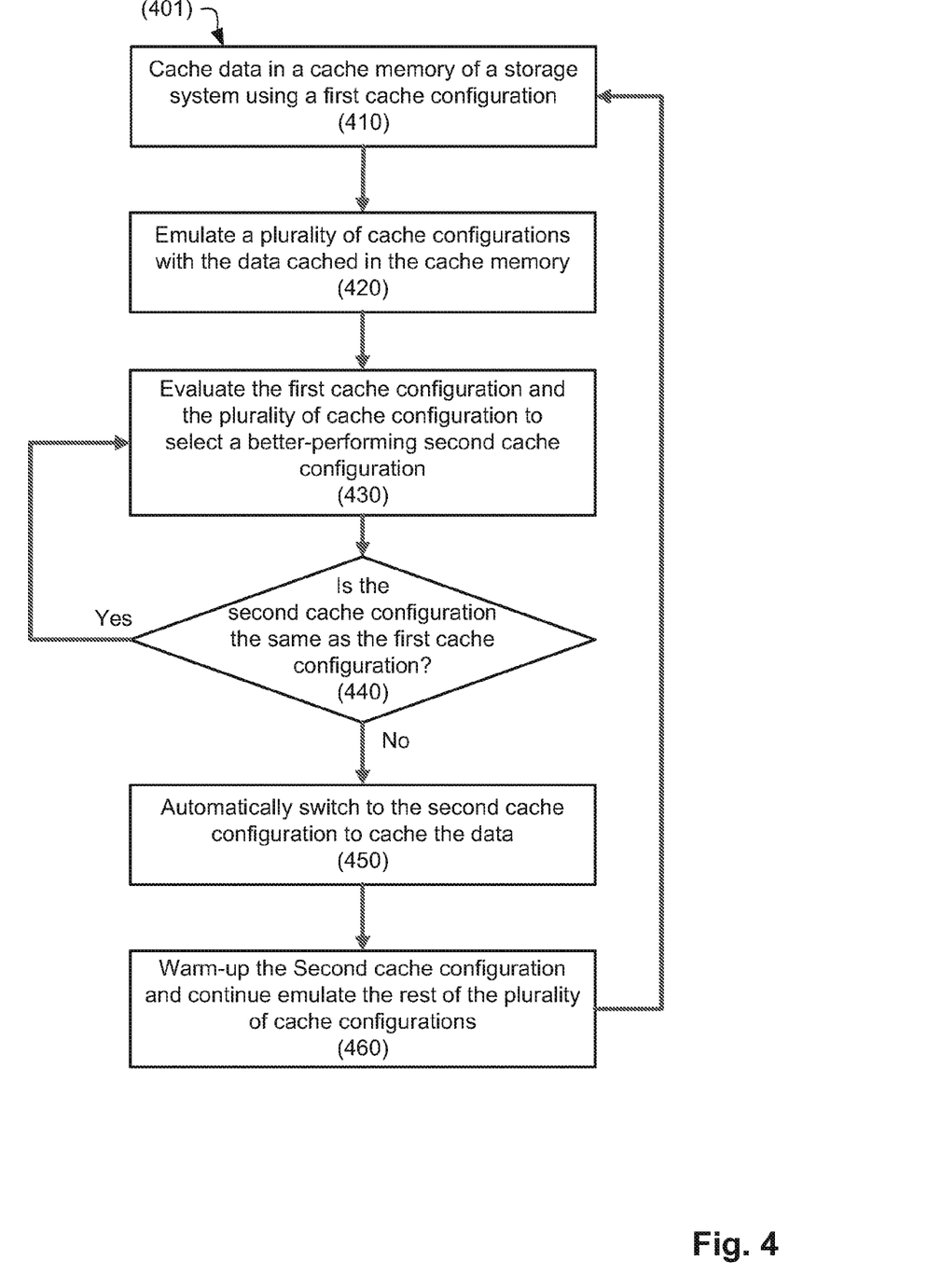
FIG. 4 illustrates a flow diagram of a process for implementing dynamic switching of cache policies for a storage system.

FIG. 4 illustrates a flow diagram of a process 401 for implementing dynamic switching of cache policies in a storage system, in accordance with certain embodiments of the present invention. The process 401 can be performed by processing logic that may comprise various types of hardware (e.g., special-purpose circuitry, dedicated hardware logic, programmable hardware logic, etc.). The process 401 can also be implemented as instructions that can be executed on a processing device, firmware that can be embedded in special-purpose circuitry, or a combination thereof. In one embodiment, machine-executable instructions for the process 401 can be stored in memory 142 of FIG. 1, executed by the processor 141 of FIG. 1, and/or implemented by the dynamic cache-policy switching storage system 130 of FIG. 1.

Referring back to FIG. 4, at 410, data stored or to be stored in a storage system is cached in a real cache memory using a specific cache configuration. The specific cache configuration for the real cache memory can be arranged by an administrator of the storage system. It can also be a default cache configuration automatically assigned by the storage system. At 420, multiple cache emulations are constructed to emulate cache memories with different sizes or different cache policies. Each of the cache emulations is a cache configuration containing its own hash function and hash structure for emulating the caching of the storage data. A cache-policy switching module monitors the cache emulations and transmits the same data requests received by the cache memory of the storage system to the cache emulations. In one embodiment, the emulations utilize a sampling scheme as described above, which greatly reduces the memory and CPU requirements. Note that the operations at 410 and 420 can be performed repeatedly for an extended period of time before the process 401 proceeds to 430. The operations at 410 and 420 can also be performed independently and concurrently of each other.

At 430, once the cache memory and the multiple emulated cache configurations are implemented, the storage system proceeds with its normal data services. When a read or write request is processed by the cache memory and the cache emulations, the performance information are collected. After the storage system has been operational for a predetermined amount of time, or in responsive to some other specified trigger conditions, the cache-policy switching module can compare the performance of the cache memory configuration with the performance of the cache emulations. In one embodiment, one emulated cache configuration can have a better hit rate, while another can have a faster latency in responding to read/write requests. Based on the types of usage the storage system encounters, the storage system can determine that either the better hit rate one or the faster responding one is deemed the better performing cache configuration. Alternatively, the policy can be selected based on performance metrics defined in a service level agreement.

At 440, the cache-policy switching module determines whether the better performing cache configuration is the same cache configuration that is currently used by the cache memory. If the result of the determination is YES, then the original cache memory configuration is not changed, and the process 401 proceeds to 430. Later, process 401 can perform the evaluation of 430 again in order to find a better performing configuration. Such an approach allows the storage system to tailor its cache memory configuration to any future changes in storage data usage, even if the existing configuration appears to be satisfactory. Thus, the administrator is freed from constantly monitoring and evaluating the performance of the cache memory, as well as determining when to apply a different cache configuration.

If the result of the determination at 440 is NO, then process 401 proceeds to 450. In one embodiment, the better performing cache configuration evaluated at 430 emulates a memory size that is different from the size of the existing cache memory. If hardware configuration is involved in adding or removing of the cache memory, the better performing configuration might not be automatically applied to the cache memory. Thus, cache-policy switching module can inform and advise the administrator, through any conventional output mechanisms (e.g., output display, email notification, etc), that a different cache memory size may yield better performance, and wait for the administrator to make the configuration changes. Alternatively, if the better performing cache configuration can be applied to the cache memory with a software update or a configuration change, then the cache-policy switching module can automatically switch to the better performing cache configuration by making the configuration updates.

At 460, once the better performing cache configuration is applied to the cache memory, the already cached data in the cache memory may be stall, which means some of the cached data in the cache memory would not have been cached, and would have been replaced, if the better performing cache configuration was originally applied to the cache memory. Since a stalled cache memory can result in a lower hit rate and poorer caching performance, to better reflect the true performance of the new cache configuration, the storage system can "warm-up" the cached data by proceeding with its routine caching of storage data for a predetermined amount of time, thereby allowing the new cache configuration to replace the previously cached data with newer requested data. During warm-up, the data can be cached according to the new cache configuration, and no performance statistics are collected in the meantime. The warming-up of a cache configuration also ensures that the current configuration's performance is accurately reflected without the influence from the prior cache configuration. Further, the storage system can continue emulating different cache configurations, including the configuration that was originally applied to the cache memory and later replaced by the better performing one.

In one embodiment, each of the cache emulations preserves its already cached data, so that the impact of switching cache configurations can also be studied. The length of the warm-up period and the frequency of cache-policy switching can also be evaluated based on the performance information collected from the cache emulations. Alternatively, some of the emulated cache configurations can swap out or clear their emulated cache data and cache metadata, so that they can have a fresh start. Such an approach is useful when the data usage pattern of the storage system will be completely changed. Also, the emulated cache configurations can have a warm-up period similar to the one given to the newly applied cache configuration. For some policies, the entire cache may not need to be warmed up with new data before starting to evaluate the cache performance. For other policies, the cache emulation can consider the number of incoming requests in accurately accessing a change in workload and the potential need to switch cache configurations. After the period of warm-up ends, the cache memory and the cache emulations can start their normal operations of caching and emulations with their respective performance indicators being collected. The process 401 then loops back to 410, in which a new round of caching and evaluation is performed by the storage system to automatically adjust the cache memory configuration based on the real-time storage data usage.

Figure 5:
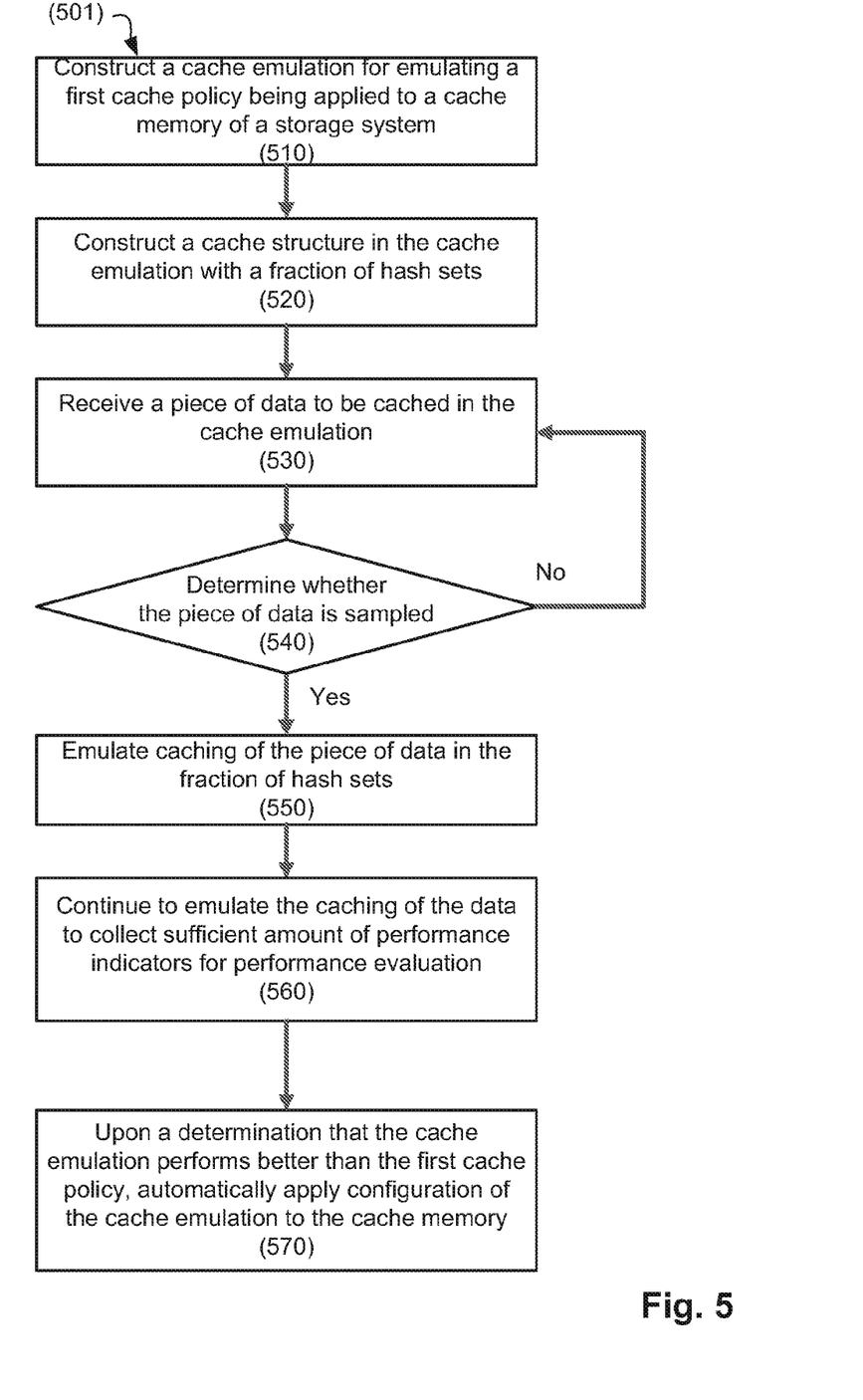
FIG. 5 illustrates a flow diagram of a process for emulating a cache policy with a sampled set of data.

FIG. 5 illustrates a flow diagram of a process 501 for emulating a cache policy with a sampled set of data, according to certain embodiments of the present invention. The process 501 can be performed by processing logic that may comprise various types of hardware (e.g., special-purpose circuitry, dedicated hardware logic, programmable hardware logic, etc.). The process 501 can also be implemented as instructions that can be executed on a processing device, firmware that can be embedded in special-purpose circuitry, or a combination thereof. In one embodiment, machine-executable instructions for the process 501 can be stored in memory 142 of FIG. 1, executed by the processor 141 of FIG. 1, and/or implemented by the dynamic cache-policy switching storage system 130 of FIG. 1.

At 510, a cache emulation is constructed by the storage system to emulate a different sized cache memory or a different cache policy. At 520, the cache emulation uses a hash function and a hash structure for storing emulation data. In one embodiment, no additional cache memory blocks are needed for the caching emulation. Also, the hash structure contains a fraction of the hash sets for emulating a sampled amount of storage data. Such an approach ensures that the cache emulation does not take up a large amount of storage memory.

At 530, a piece of data to be cached in the cache memory is also submitted by the cache-policy switching module to the cache emulation. At 540, the cache-policy switching module determines whether the piece of storage data is sampled in the cache emulation. The sampling can be determined by inputting the LBN to the hash function of the cache emulation for generating of a hash value. If the hash value does not match any hash sets that are sampled by the hash emulation at 520, then the piece of data is discarded by the hash emulation, and no additional actions are necessary. In this case, process 501 proceeds to 530 to receive additional storage data requests. If the determination at 540 found a hash set that matches the hash value, then the piece of data is sampled, and process 501 proceeds to 550, in which the caching of the piece of data is emulated, and the performance statistics are recorded.

At 560, the cache-policy switching module repeats the operations from 530 to 550 until there are sufficient amount of performance data being collected by the cache emulation. Since sampling a fraction of hash sets reduces the amount of data stored in the cache emulation, in order to accurately simulate the performance of caching all the data, the cache emulation needs to be processed longer. In one embodiment, the amount of emulation becomes sufficient once the cache emulation processed enough storage data that is equal to the amount of data processed by a non-sampling cache emulation. At this point, process 501 proceeds to 570. At 570, upon a determination that the cache emulation performs better than the cache policy being utilized by the actual cache memory, the cache-policy switching module can automatically apply the configuration of the cache emulation to the cache memory.

Thus, methods and systems for dynamic switching cache policies in a storage system have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software and/or firmware to implement the techniques introduced here may be stored on a machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   caching data in a cache memory of a storage system using a first cache configuration;
   emulating caching of the data being cached in the cache memory with a plurality of cache configurations in the storage system;
   evaluating caching performance of the first cache configuration and the plurality of cache configurations based on a set of performance indicators; and
   upon a determination that a second cache configuration selected from the plurality of cache configurations performs better than the first cache configuration based on the set of performance indicators, automatically applying the second cache configuration to the cached memory for caching of the data.

2. The method as recited in claim 1, further comprising:
   emulating caching of the data being cached in the cache memory with a second plurality of cache configurations; and
   automatically applying a third cache configuration to the cached memory, wherein the third cache configuration is selected from the second plurality of cache configurations, and the third cache configuration performs better than the second cache configuration in caching the data based on the set of performance indicators.

3. The method as recited in claim 1, further comprising:
   warming-up the second cache configuration with the data being cached in the cache memory before evaluating the second cache configuration's caching performance.

4. The method as recited in claim 1, wherein a cache configuration selected from the plurality of cache configurations emulates a cache memory with a size different from the cache memory of the storage system.

5. The method as recited in claim 1, wherein a cache configuration selected from the plurality of cache configurations emulates a cache policy different from the first cache configuration's cache policy.

6. The method as recited in claim 1, wherein a cache configuration selected from the plurality of cache configurations emulates caching of the data by maintaining a hash structure for storing metadata associated with the data.

7. The method as recited in claim 1, wherein a cache configuration selected from the plurality of cache configurations emulates caching of the data by storing metadata associated with the data without storing the data.

8. The method as recited in claim 6, wherein the cache configuration samples a fraction of the data being cached in the cache memory by selecting the data that is associated with a predetermined subset of a plurality of hash values.

9. The method as recited in claim 1, wherein a cache configuration selected from the plurality of cache configurations includes a hash structure for storing metadata of the data being cached in the cache memory and a hash function for storing and locating the metadata in the hash structure.

10. The method as recited in claim 1, wherein said automatic switching to a second cache configuration further comprises:
preserving data already being cached in the cache memory; and
caching newly requested data in the cache memory based on the second cache configuration.

11. The method as recited in claim 1, wherein the method is embodied in a machine-readable storage medium as a set of instructions which, when executed by a processor, cause the processor to perform the method.

12. A method comprising:
constructing a cache emulation for emulating a first cache policy being applied to a cache memory of a storage system, wherein the cache memory is implemented with a second cache policy, and the cache emulation processes a same set of storage data cached or to be cached in the cache memory;
emulating caching of a sampled set of the storage data by the cache emulation;
collecting cache performance indicators from the cache memory and the cache emulation;
evaluating the cache performance indicators to determine whether the first cache policy performs better than the second cache policy based on a set of performance indicators; and
upon a determination that the first cache policy performs better than the second cache policy, automatically applying the first cache policy to the cache memory.

13. The method as recited in claim 12, wherein the emulating caching of a sample set of the storage data further comprises:
upon a determination that a piece of storage data is not sampled by the cache emulation, ignoring the piece of storage data for emulation.

14. The method as recited in claim 12, wherein the emulating caching of a sample set of the storage data further comprises:
upon a determination that a piece of storage data is sampled by the cache emulation, emulating caching of the piece of storage data in the cache emulation.

15. The method as recited in claim 12, wherein the emulating caching of a sample set of the storage data further comprises:
allowing emulation to process an amount of the storage data that is equal to the full set of the storage data being processed by the cache memory.

16. A storage system comprising:
a storage unit to store user data;
a cache memory to cache the user data, wherein a cache configuration is applied to the cache memory;
a plurality of cache emulations each of which emulates caching of the user data being cached by the cache memory; and
a cache-policy switching module to evaluate caching performance of the cache configuration applied to the cache memory,
evaluate caching performance of the plurality of cache emulations, and
upon a determination that a cache emulation selected from the plurality of cache emulations performs better than the cache configuration, automatically apply a configuration of the cache emulation to the cache memory.

17. The system as recited in claim 16, wherein a cache emulation selected from the plurality of cache emulations emulates a cache memory with a size different from the cache memory of the storage system.

18. The system as recited in claim 16, wherein a cache emulation selected from the plurality of cache emulations emulates a cache policy different from the cache configuration's cache policy.

19. The system as recited in claim 16, wherein a cache emulation selected from the plurality of cache emulations emulates caching of the user data by storing metadata associated with the user data without storing the user data.

20. The system as recited in claim 16, wherein a cache emulation selected from the plurality of cache emulations samples a fraction of the user data to be cached in the cache memory by selecting the user data that is associated with a predetermined set of hash values.

21. A system comprising:
a hash function for converting a set of data to one of a plurality of hash values;
a hash structure for maintaining a plurality of hash sets associated with the plurality of hash values; and
an emulated cache configuration coupled with the hash function and the hash structure, the emulated cache configuration being configured to:
transmit data being cached in a cache memory to the hash function for generating a hash value,
identify a hash set in the hash structure that is associated with the hash value, and
upon a determination that the data is to be emulated for caching, emulate caching of the data being cached in the cache memory by storing metadata of the data in the hash set of the hash structure, without storing the data in memory blocks.

22. The system as recited in claim 16, wherein the emulated cache configuration is further configured to:
determine whether to emulate caching of the user data by evaluating if the hash value being one of a set of hash values that are sampled for cache emulation.

23. The system as recited in claim 16, wherein the emulated cache configuration is further configured to:
collect cache performance indicators associated with the storing of metadata in the hash structure.

24. The system as recited in claim 16, wherein the emulated cache configuration is further configured to:
upon a determination that an emulate-cached data is to be emulated for swapping-out, emulate swapping out of the emulate-cached data by removing metadata of the emulate-cached data from the hash structure.

* * * * *